United States Patent [19]

Togano

[11] Patent Number: 5,490,585

[45] Date of Patent: Feb. 13, 1996

[54] SHIFT LEVER APPARATUS

[76] Inventor: Norio Togano, c/o Fujikiko Kabushiki Kaisha, Washizu-kojyo, 2028 Washizu, Kosai-shi, Shizuoka-ken, Japan

[21] Appl. No.: 347,263

[22] Filed: Nov. 30, 1994

[30] Foreign Application Priority Data

Nov. 30, 1993 [JP] Japan .................................. 5-299617

[51] Int. Cl.[6] .................................................. B60K 41/28
[52] U.S. Cl. ............................ 192/4 A; 477/99; 70/248; 74/483 R
[58] Field of Search ............................... 192/4 A; 74/475, 74/483 R; 477/96, 99; 70/245, 247, 248

[56] References Cited

U.S. PATENT DOCUMENTS

| | | | |
|---|---|---|---|
| 4,671,085 | 6/1987 | Yamaguchi et al. | 70/248 |
| 4,926,688 | 5/1990 | Murasaki | 70/248 X |
| 5,197,356 | 3/1993 | Kobayashi et al. | 477/99 |
| 5,293,763 | 3/1994 | Asano et al. | 70/248 |
| 5,379,871 | 1/1995 | Asano et al. | 192/4 A |

*Primary Examiner*—Richard M. Lorence
*Attorney, Agent, or Firm*—Klarquist Sparkman Campbell Leigh & Whinston

[57] ABSTRACT

To prevent an erroneous operation of the key interlock mechanism (cylinder key) (60) and further to improve the function of the key interlock mechanism and the operability of the shift lever (30), a shift lever apparatus comprises: a shift lever (30) having a position pin (31) shifted between a park position (P) and drive positions; a shift lever lock mechanism (40) for locking the position pin located at the park position having: a key lock lever (41) formed with a first arm portion (41a) and a second arm portion (41b); a support lever (42) pivotally supported by the second arm portion (41b) of the key lock lever and formed with an end arm portion (42a), the position pin (31) being pinched between the first arm portion (41a) of the key lock lever (41) and the end arm portion (42a) of the support lever (42); a first spring (44) for urging the first arm portion (41a) of the key lock lever (41) toward the position pin; a second spring (45) for urging the end arm portion (42a) of the support lever (42) toward the position pin; and a lock lever (43) associated with the key lock lever (41) to lock the position pin located at the park position; an actuator (46) for selectively pivoting the lock lever (43) between lock and unlock positions of the position pin located at the park position; and a key interlock mechanism (60) driven by an engine key and linked with the second arm portion (41d) of the key lock lever (41) via a key lock cable (61).

8 Claims, 4 Drawing Sheets

SHIFT LEVER APPARATUS

BACKGROUND OF THE INVENTION

1. Technical Field

The present invention relates to a shift lever apparatus, and more specifically to a shift lever apparatus for an automatic transmission of an automotive vehicle, which is provided with both a shift lever lock mechanism and a key interlock mechanism linked with the shift lever lock mechanism.

2. Description of the Related Art

An example of the shift lever apparatus of this type is disclosed in Japanese Published Unexamined (Kokai) Patent Application No. 60-135352, for instance, as shown in FIG. 1. In FIG. 1, a shift lever 1 is pivotally supported by a frame 7 at a base portion la thereof. The shift lever 1 is provided with a position pin 2 movable in the axial direction of the shift lever 1. This position pin 2 is engaged with or disengaged from a position groove 3a formed in a position plate 3 fixed to the frame 7 under such a condition as to be always urged upward. This position pin 2 can be moved downward when a knob button (not shown) attached to a top of the shift lever 1 is pushed.

Further, a bell-crank shaped key lock lever 4 is pivotally supported on the position plate 3. When the position pin 2 is engaged with a Park position P of the position groove 3a, an engage groove 4a of this key lock lever 4 is simultaneously engaged with the position pin 2, as shown in FIG. 1. The key lock lever 4 is a part of a shift lever lock mechanism, and always urged clockwise by an urging means (a spring) (not shown) and further linked with a key interlock mechanism (not shown) via a key lock cable 6. Therefore, the urging means for the key lock lever 4 is also urges the key lock cable 6.

In the prior art shift lever apparatus as described above, however, in the state where an engine key (ignition key) is removed from the key interlock mechanism (i.e., under steering lock condition), when the knob button is pushed to move the position pin 2 downward in order to shift the shift lever 1 from the Park position P to another position, since the key lock lever 4 is locked by the key lock cable 6, whenever the knob button is strongly pushed, the key lock lever 4 locked by the key lock cable 6 is pivoted clockwise, so that there exists such a problem that an excessive force is applied to the key lock cable 6 and thereby the key lock cable 6 is elongated or the key interlock mechanism is unlocked at the worst.

In addition, the width of the engage groove 4a of the key lock lever 4 is determined wider that the diameter of the position pin 2, so that the position pin 2 can be moved smoothly in the vertical direction. However, a play is inevitably produced between the position pin 2 and the engage groove 4a of the key lock lever 4. This play deteriorates the response characteristic of the key lock lever 4, when the position pin 2 located at the Park position P is moved downward. Further, the key interlock function deteriorates because the key lock lever 4 is not pivoted by the key lock cable 6 immediately due to the presence of the play between the position pin 2 and the key lock lever 4.

Furthermore, since the position pin 2 is urged upward and the key lock lever 4 is urged clockwise; that is, the position pin 2 and the key lock lever 4 are urged in the opposite directions with respect to each other, it is necessary to increase the urging force of the position pin 2 than that of the key lock lever 4, so that a larger force is required to push the knob button, thus causing anther problem in that the operability of the shift lever degraded.

SUMMARY OF THE INVENTION

With these problems in mind, therefore, it is the object of the present invention to provide a shift lever apparatus which can prevent an erroneous operation of the key interlock mechanism while improving both the key interlock function and the shift lever operability.

To achieve the above-mentioned object, the present invention provides a shift lever apparatus, comprising: a shift lever (30) having a position pin (31) shifted between a park position (P) and drive positions; a shift lever lock mechanism (40) for locking the position pin located at the park position having: a key lock lever (41) formed with a first arm portion (41a) and a second arm portion (41b); a support lever (42) pivotally supported by the second arm portion (41b) of the key lock lever and formed with an end arm portion (42a), the position pin (31) being pinched between the first arm portion (41a) of the key lock lever (41) and the end arm portion (42a) of the support lever (42); first urging means (44) for urging the first arm portion (41a) of the key lock lever (41) toward the position pin; second urging means (45) for urging the end arm portion (42a) of the support lever (42) toward the position pin; and a lock lever (43) associated with the key lock lever (41) to lock the position pin located at the park position; an actuator (46) for selectively pivoting the lock lever (43) between lock and unlock positions of the position pin located at the park position; and a key interlock mechanism (60) driven by an engine key and linked with the second arm portion (41a) of the key lock lever (41) via a key lock cable (61).

In the shift lever apparatus according to the present invention, when the shift lever is shifted to the park position and the engine key is removed from said key interlock mechanism, the key lock cable (61) is locked by said key lock mechanism (60) and thereby the key lock lever (41) is also locked, so that the position pin (31) is pressure pinched between the first arm portion (41a) of the key lock lever (41) and the end arm portion (42a) of the support lever (42) and further the key lock lever (41) pivots the lock lever (43) to the lock position of the position pin. Under these conditions, a load applied to the position pin (31) is transmitted to only the support lever (42), and a slight elastic force of the first urging means (44) is applied to the key lock lever (41) without moving the key lock cable (61) for prevention of erroneous operation of the key interlock mechanism (60). Further, under these conditions, a slight elastic force of the first urging means (44) is applied to the position pin (31) to reduce a force for moving a knob button (34) of the shift lever (30). Further, under these conditions, the position pin (31) is pinched between the first arm portion (41a) of the key lock lever (41) and the end arm portion (42a) of the support lever (42) by a strong elastic force of the second urging means (44) to eliminate a play between the position pin (31) and the first arm portion (41a), the end arm portion (42a) for improvement of reliability of said key interlock mechanism.

Further, when the engine key is rotated to an ON position, the actuator (46) is energized to pivot the lock lever (43) to the lock position of the position pin (31) and further the key lock cable (61) is unlocked by said key lock mechanism (60); and when a brake pedal is further depressed, the actuator (46) is deenergized to move the lock lever (43) to the unlock position of the position pin, so that the position pin (31) can be shifted from the park position to the drive position by pivoting the key lock lever (41) and the support lever (42). Under these conditions when the shift lever (30) is shifted to the drive position, the key lock lever (41) and the support lever (42) are both pivoted in contact with the position pin by an elastic force of the first urging means (44) without delay of a downward motion of the position pin. Further, under these conditions when the shift lever is returned to the park position, the actuator (46) is energized to pivot the shift lever (43) to the lock position of the position pin, and the key lock lever (41) is pivoted by the shifted position pin (31) to pull the key lock cable (61) so that key interlock mechanism (60) is set unlocked to allow the engine key to pivot to a LOCK position at which the engine key can be removed.

DETAILED DESCRIPTION OF THE EMBODIMENTS

An embodiment of the shift lever apparatus according to the present invention will be described hereinbelow with reference to the attached drawings.

Figure 1:
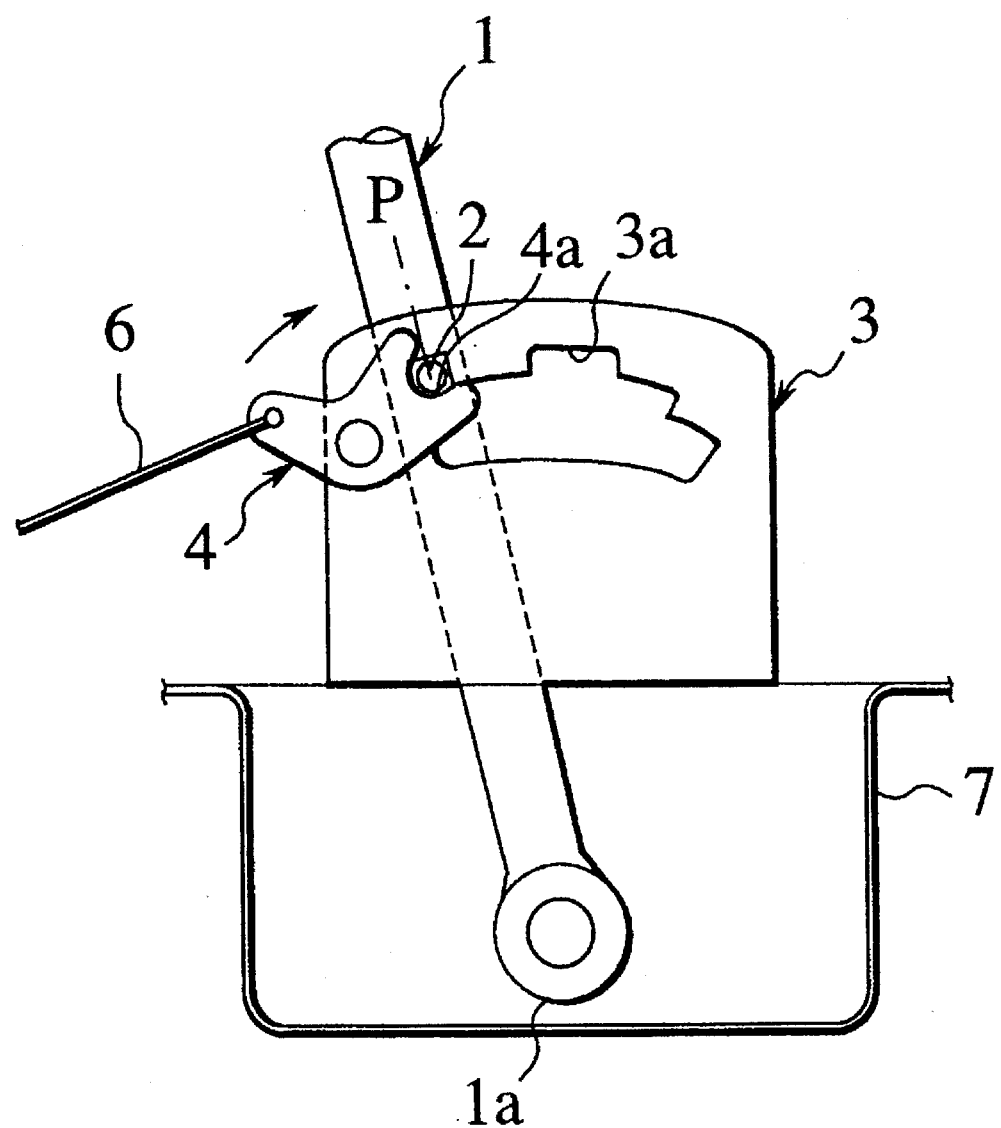
FIG. 1 is a diagrammatical front view showing a prior art shift lever apparatus.
Figure 2:
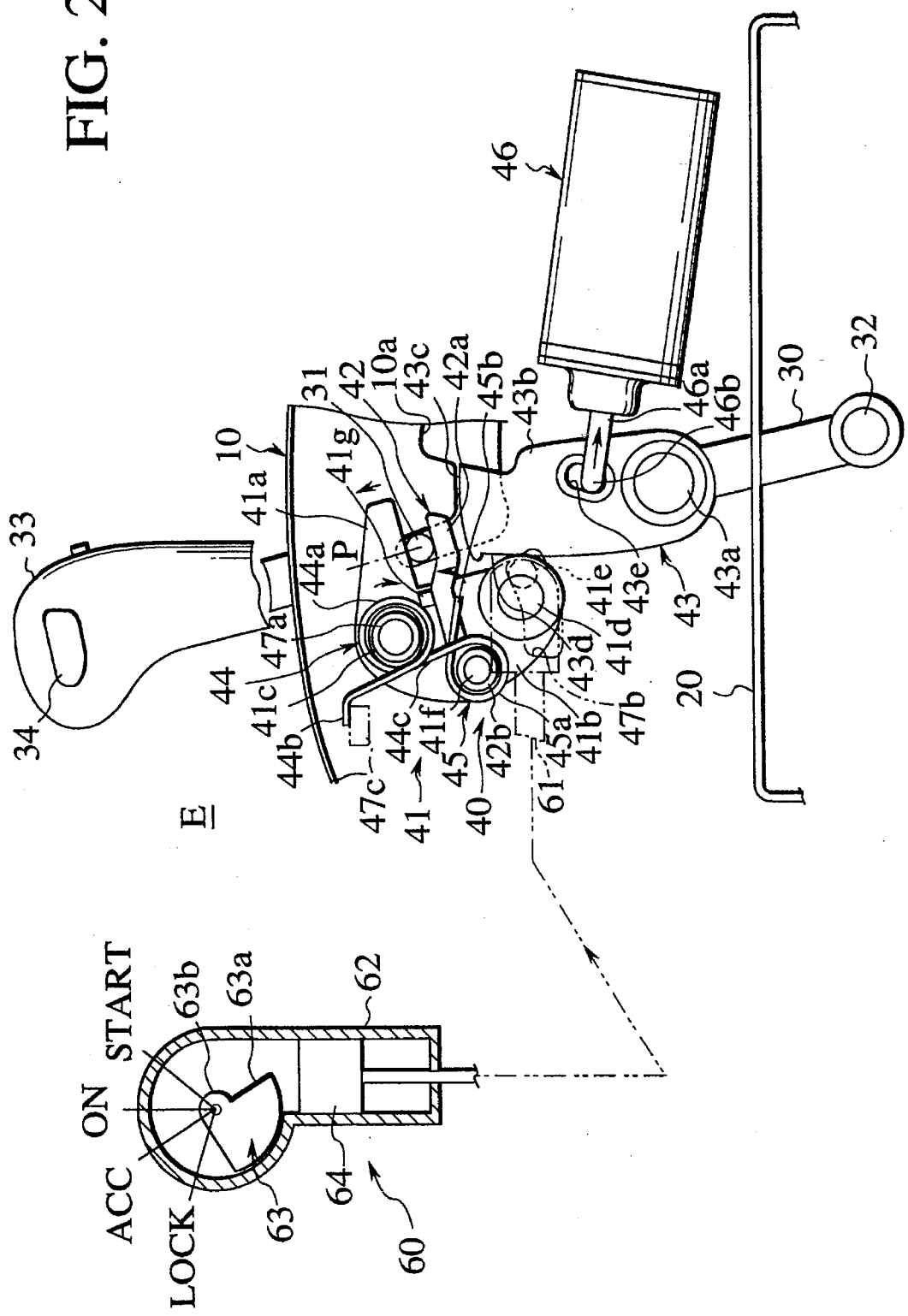
FIG. 2 is a partial front view for assistance in explaining a shift lever apparatus for an automatic transmission of an automotive vehicle according to the present invention, in which the lock status of the shift lever lock mechanism is shown.
Figure 3:
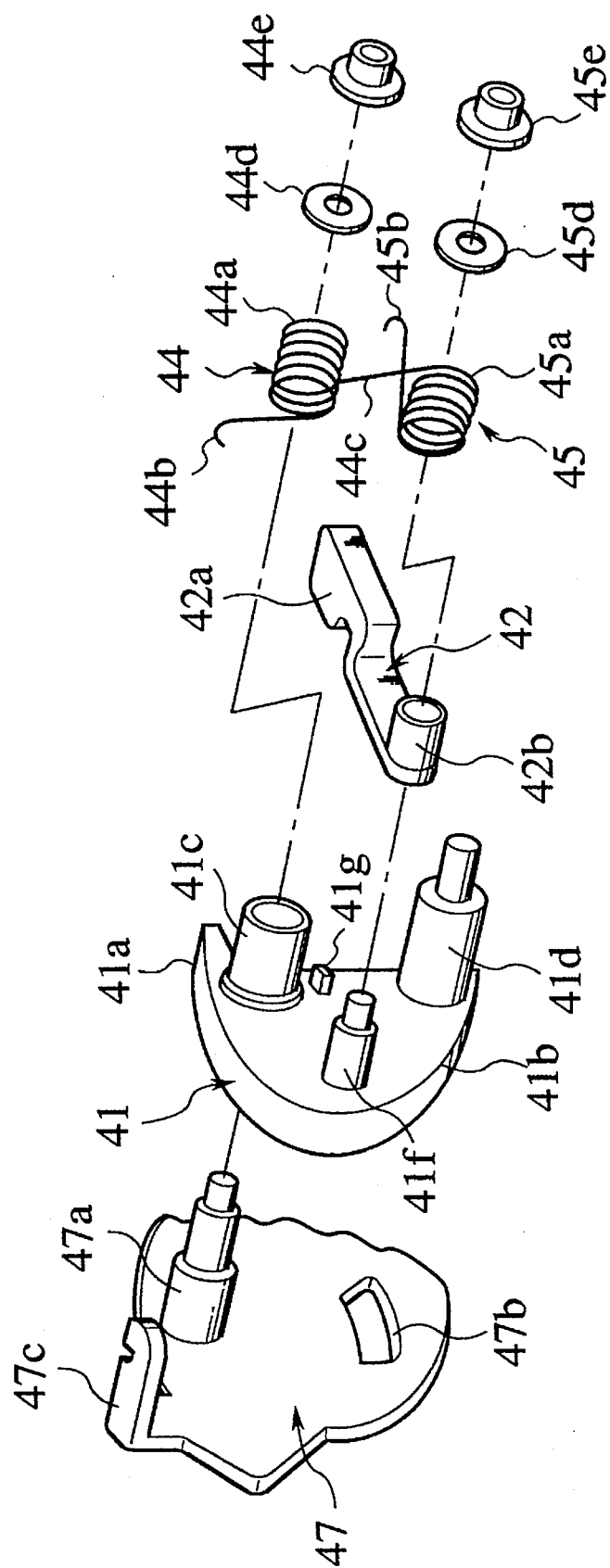
FIG. 3 is an exploded view showing an essential portion of a shift lever lock mechanism shown in FIG. 2.
Figure 4:
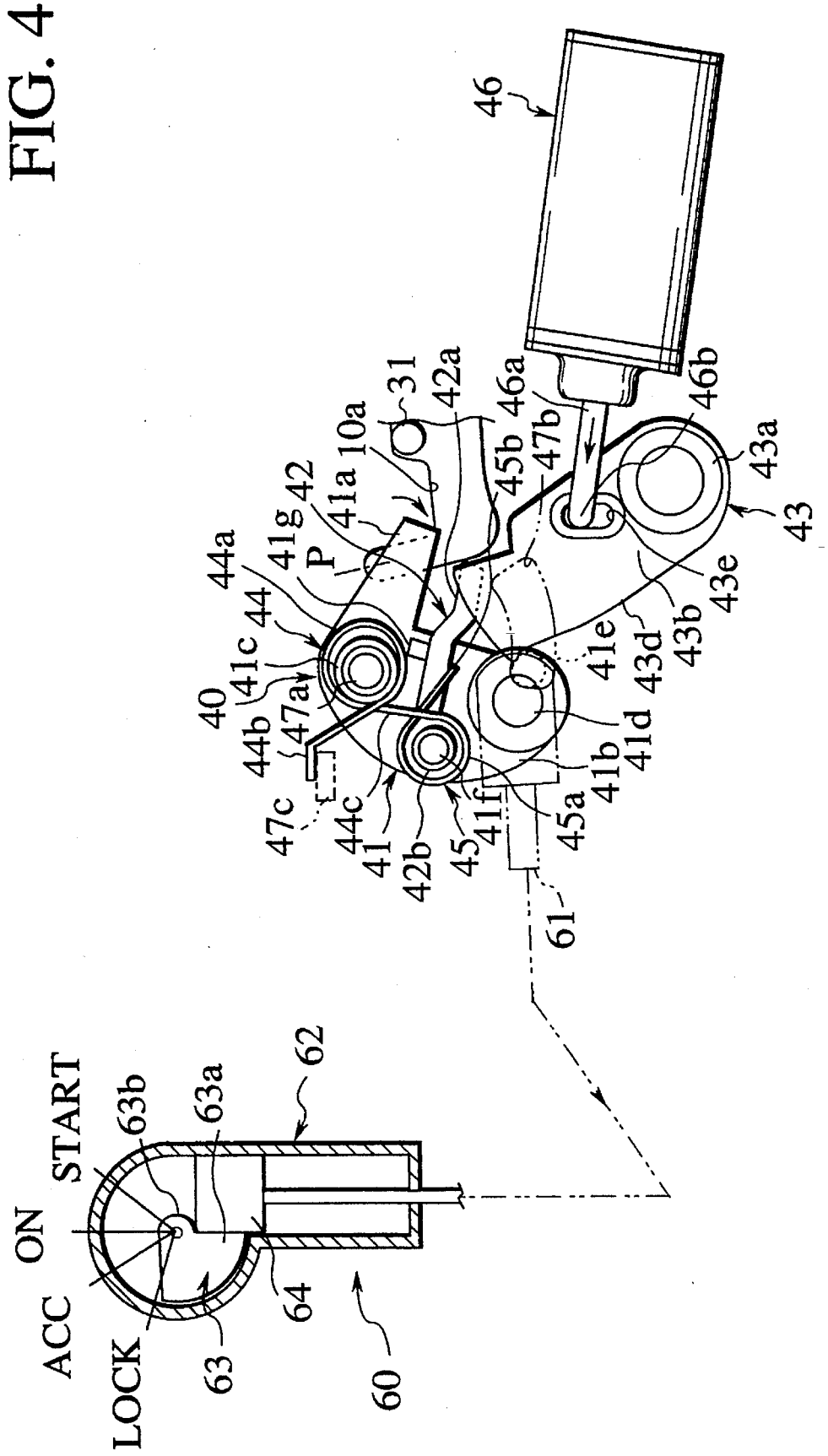
FIG. 4 is a partial front view for assistance in explaining the shift lever apparatus for an automatic transmission of an automotive vehicle according to the present invention, in which the unlock status of the shift lever lock mechanism is shown.

In FIGS. 2 to 4, a shift lever apparatus E for an automatic transmission of an automotive vehicle roughly comprises a shift lever 30, a shift lever lock mechanism 40 and a key interlock mechanism 60. The shift lever 30 is pivotally supported on a frame 20, and has a position pin 31 always urged upward so as to be engaged with a position groove 10a formed in a position plate 10. The shift lever lock mechanism 40 serves to prevent the position pin 31 from being moved downward whenever the shift lever 30 is shifted to Park position P. This shift lever lock mechanism 40 is linked with the key interlock mechanism (key cylinder) 60. In other words, only when the shift lever 30 is shifted to the Park position P, an engine key can be removed from a key cylinder.

The feature of this invention is to provide a shift lever lock mechanism 40 composed of a key lock lever 41, a support lever 42 and a lock lever 43 all pivotally supported by the position plate 10. Further, the key lock lever 41 is urged toward the position pin 31 by a first urging means (spring) 44 and the support lever 42 is urged toward the position pin 31 by a second urging means (spring) 45 in such a way that the position pin 31 can be pinched between both 41 and 42. Further, the key lock lever 41 is linked with the key interlock mechanism (cylinder key) 60 via a key lock cable 42. Further, the lock lever 43 is pivoted by an actuator 46 to lock the position pin 31 located at the Park position when the engine key is removed from the cylinder key.

The structure of the present invention will be described in further detail hereinbelow.

The position plate 10 is attached to the frame 20 fixed to a vehicle body, and formed with a position groove 10a near the outer circumferential surface of the frame 20. The position groove 10a is recesses so as to provide various shift positions such as Park, Reverse, Neutral, Drive, Second, and First, etc. In FIG. 2, the leftmost shift position of the position groove 10a is the Park position P. Further, the respective positions other than the Park position are referred to as drive positions, hereinafter.

The shift lever 30 (formed into a pipe) is pivotally supported by the frame 20 via a pivotal axle 32 at a base portion thereof. The position pin 31 is implanted in the horizontal direction on a rod (not shown) inserted into the shift lever 30 so as to be slidable in the axial direction of the shift lever 30. This rod is always urged upward by a compression spring (not shown). Further, a knob 33 is fixed to a top of the shift lever 30. A knob button 34 is slidably disposed in this knob 33 in such a way that a part of the knob button 34 projects outward from the knob 33 in the horizontal direction. Therefore, when the knob button 34 is pushed against a compression spring, it is possible to move the position pin 31 in the downward direction.

The shift lever lock mechanism 40 is mounted on the position plate 10 as a unit, and composed of the key lock lever 41, the support lever 42, the lock lever 43, and an actuator 46.

With reference to FIG. 3, the key lock lever 41 is formed into a bell-crank shape, and formed with a first arm portion 41a on the side near to the position pin 31 and a second arm portion 41b on the side remote from the position pin 32. The first arm portion 41a extends to the position pin (31) side, and the lower surface thereof is in contact with the position pin 31 when the shift lever 30 is at the Park position P. Further, a bush portion 41c is formed as the pivotal center portion of the key lock lever 41, into which a pivotal axle 47a fixed to a bracket 47 is inserted. A link shaft 41d is provided at the second arm portion 41b so as to extend in the same direction as the pivotal axle 47a, by which an end of the key lock cable 61 linked with the key interlock mechanism 60 is supported. Further, on the reverse side of the second arm portion 41b, a projection pin 41e (see FIG. 2) is provided in the vicinity of the link shaft 41d. This projection pin 41e is located at such a position as to be brought into contact with a rear surface 43d of the lock lever 43. This pin 41e is engaged with a circular arc-shaped restriction slot 47b formed in the bracket 47 with the axle 47a as its center. Further, a mount shaft 41f is attached to the key lock lever 41 so as to extend in the same direction as the link shaft 41d to support the support lever 42. Further, a stopper 41g is additionally attached to the key lock lever 41 to stop the pivotal motion of the support lever 42.

The support lever 42 is formed with a bush portion 42b as the base portion and an end arm portion 42a on the position pin (31) side. Into the bush portion 42b, the mount shaft 41f of the key lock lever 41 is inserted. The end arm portion 42a is located under the position pin 31 so as to be opposed to the first arm portion 41a of the key lock lever 41.

The first urging means (spring) 44 and second urging means (spring) 45 are a torsional coil spring formed integral with each other. The base portion 44a of the first urging means 44 is wound around the bush portion 41c of the key lock lever 41 and an end 44b thereof is engaged with an engage portion 47c of the bracket 47. Further, the axial movement of the first urging means 44 is restricted by a washer 44d and a push nut 44e both attached to the pivotal axle 47a. This first urging means 44 urges the key lock lever 41 so as to be pivoted in the clockwise direction. The elastic force of the first urging means 44 is determined to such an elastic force weak enough to prevent the key lock lever 41 from being pivoted inadvertently, that is, to prevent the key lock cable 61 from being moved inadvertently, whenever the position pin 31 is located at the drive positions other than the Park position P.

The second urging means 45 is formed in linkage with the other end 44c of the first urging means 44. The base portion 45a is wound around the bush portion 42b of the support lever 42 and one end 45b thereof is engaged with the lower surface of the end arm portion 42a of the support lever 42. Further, in the same way, the axial movement of the second urging means 45 is restricted by a washer 45d and a push nut 45e both attached to the link axle 41d. This second urging means 45 urges both the arm portions 41a and 42a so as to be pivoted toward each other to pressure-pinch the position pin 31 located at the Park position P between both the arm portions 41a and 42a. Further, under these conditions, the upper surface of the support lever 42 is brought into pressure contact with the stopper 41g attached to the key lock lever 41. The elastic force of the second urging means 45 is determined to be larger than that of the first urging means 44.

The lock lever 43 is pivotally supported by a pivotal axle 43a attached to the bracket 47 at the base portion 43a of the lock lever 43. The lock lever 43 is formed with an arm portion 43b extending toward the position pin 31, a lock portion 43c of a circular arc shape (formed with the pivotal axle 43a as its center), a back surface portion 43d of the arm portion 43b, and a slot 43e. The lock portion 43c is located at such a position that the position pin 31 located at the Park position P is prevented from being lowered away form the Park position groove 10a. The back surface portion 43d is brought into contact with the projection pin 41e of the key lock lever 41, as already explained. Further, a hook portion 46b of a plunger 46a of the actuator 46 described later is engaged with the slot 43e.

The actuator 46 is a solenoid fixed to a bracket 47. The plunger 46a is slidably housed therein so as to be urged outward by a compression coil spring (not shown). Further, as already explained, the hook portion 46b formed at an end of the plunger 46a is engaged with the slot 43e formed in the lock lever 43.

Further, when a lever (not shown) fixed to the shift lever 30 is brought into contact with a micro-switch (not shown), since the micro-switch is turned on, the solenoid 46 is energized, so that the plunger 46a is extracted into the solenoid 46 to pivot the lock lever 43 clockwise, as shown in FIG. 2. Therefore, the lock portion 43c of the lock lever 43 can be pivoted to such a position as to face the position pin 31 located at the Park position P to prevent the position pin 31 from being lowered. On the other hand, when a brake pedal is depressed before the vehicle drive, since the micro-switch is turned off, the solenoid 46 is deenergized, so that the plunger 46a projects outward by an elastic force of the compression spring to pivot the lock lever 43 counterclockwise, as shown in FIG. 4. Therefore, the lock portion 43b of the clock lever 43 is pivoted to such a position as to be located away from the position pin 31 located at the Park position P.

The key interlock mechanism 60 is a cylinder key having a key rotor 63. When an engine key is removed from the key cylinder 62, the key rotor 63 is pivoted to a LOCK position as shown in FIG. 2, at which the steering is locked. When the engine key is inserted into the key cylinder 62 and then pivoted therewithin, the key rotor 63 can be pivoted to any of an ACC position at which the engine is stopped but the electric appliances can be used, an ON position at which the engine is running, and a START position at which the engine can be started.

Further, in the key cylinder 62, a stopper 64 linked with the key lock lever 41 via the key lock cable 61 is provided. As shown in FIG. 2, when the key rotor 63 is located at the lock position, the upward motion of the stopper 64 is restricted to lock the shift lever 30 by the shift lever lock mechanism 40. However, as shown in FIG. 4, when the key rotor 63 is located at positions other than the LOCK position, the stopper 64 can be inserted deep into the key cylinder 62 by the key lock cable 61, so that the shift lever lock mechanism 40 can be pivoted to the shift lever unlock position.

Further, as shown in FIG. 2, when the position pin 31 is located at the Park position P, since the key lock cable 61 is pulled by the key lock lever 41, the stopper 64 is lowered within the key cylinder 62 to a rotor unlock position at which the key rotor 63 can be rotated to the LOCK position.

Further, the key rotor 63 is formed with a restriction portion 63a for preventing the stopper 64 from being moved upward to the rotor lock position (upper position as shown in FIG. 4) when the key rotor 63 is located at the LOCK position as shown in FIG. 2, and another restricting portion 63b for restricting the stopper 64 from being moved further upward when the key rotor 43 is located at the rotor lock position as shown in FIG. 4.

The operation of the shift lever apparatus will be described hereinbelow.

When the vehicle is parked, the shift lever 30 is shifted to the Park position P and the engine key is removed from the cylinder key 60. Under these conditions, as shown in FIG. 2, the position pin 31 located at the Park position P is pinched between the first arm portion 41a of the key lock lever 41 and the end arm portion 42a of the support lever 42 mainly by a spring force of the second urging means 45. Here, although the solenoid 46 is deenergized, since the clockwise direction of the key lock lever 41 is restricted by the position pin 31 located at the Park position P, the key lock cable 61 is kept pulled toward the key lock lever 41 and further the lock lever 43 is pivoted counterclockwise by the key lock lever 41 (because the back surface 43d of the lock lever 43 is in contact with the projection pin 41e of the key lock lever 41), so that the lock lever 43 is located at the shift lever lock position; that is, the lock portion 43c thereof faces the position pin 31 located at the Park position P. Under these conditions, on the other hand, since the stopper 64 of the cylinder key 60 is pulled downward by the key lock cable 61 at such a position that the key rotor 63 can be pivoted (the rotor unlocked condition), as shown in FIG. 2, the key rotor 63 can be further pivoted counterclockwise to restrict the upward movement of the stopper 64, with the result that the key lock lever 41 cannot be pivoted clockwise.

Under these conditions as described above, even if the knob button 43 is pushed to release the lock of the shift lever 30, that is, to move the position pin 31 downward, it is impossible to move the position pin 31 downward because the presence of the lock portion 43c of the lock lever 43.

Here, the load applied to the position pin 31 is transmitted to only the support lever 42 (without being transmitted to the key lock lever 41 as with the case of the prior art apparatus), and only a slight load of an elastic force of the first urging means 44 is applied to the key lock lever 41 in the clockwise direction in FIG. 2. Accordingly, the key lock lever 61 will not be moved clockwise, so that it is possible to prevent the key interlock mechanism 60 from being operated erroneously by the clockwise motion of the key lock lever 41.

Further, since only a slight force of the first urging means 44 is applied to the position pin 31, it is possible to reduce the force for sliding the knob button 34 to move the position pin 31 downward, so that it is possible to improve the operability of the knob button 34.

Further, since the position pin 31 located at the Park position P is pinched between the respective arms 41a and 42a of the key lock lever 41 and the support lever 42 mainly by the elastic force of the second urging means 44, it is possible to eliminate the play between the position pin 31 and the key lock lever 41 or the support lever 42, so that the key interlock mechanism 60 can be operated securely via the key lock cable 61 at high response speed.

To drive the vehicle, the engine key is inserted into the cylinder key 60 and then the key rotor 63 is pivoted to the ON position. Then, since the restriction portion 63a of the key rotor 63 is moved away from the vertical slide path of the stopper 64, the stopper 64 can be moved upward. However, since the key lock lever 41 is pushed counterclockwise by the position pin 31, the stopper 64 is kept at the position as shown in FIG. 2. Here, since the solenoid 46 is turned on, the plunder 46a is extracted to hold the lock lever 43 at the current position for locking the position pin 31.

Under these conditions, when the engine is started and the brake pedal is depressed, since the solenoid 46 is turned off, the plunger 46a projects to pivot the lock lever 43 counterclockwise, so that the lock portions 43c of the lock lever 43 is moved away from the movement locus of the position pin 31, as shown in FIG. 4.

Here, when the knob button 34 is pushed to lower the position pin 31, since the stopper 64 can be moved upward in the key cylinder 62 as shown in FIG. 4, the key lock lever 41 and the support lever 42 both can pivot clockwise, so that it is possible to shift the position pin 31 from the Park position P to the drive position to drive the vehicle.

Here, since the key lock lever 41 can follow the downward movement of the position pin 31 by the elastic force of the first urging means 44, it is possible to prevent the downward motion of the lock lever 43 from being delayed from that of the position pin 31.

Further, when the shift lever 30 is shifted from the drive position to the Park position P, since the lever of the shift lever 30 is brought into contact with the micro-switch, the solenoid 46 is turned on to extract the plunger 46a. Then, since the lock lever 43 is pivoted clockwise to the position pin lock position and further since the key lock lever 41 is pivoted counterclockwise by the position pin 31 at the same time, the stopper 64 of the cylinder key 60 is pulled downward to the rotor unlock position by the key lock lever 41 via the key lock cable 61, so that the key rotor 63 can be moved to the LOCK position as shown in FIG. 2, at which the engine key can be removed.

As described above, the load applied to the position pin located at the Park position for moving down the position pin is transmitted to only the support lever, and only a slight downward load of the first urging means is applied to the key lock lever, it is possible to prevent an erroneous operation of the key interlock mechanism due to the clockwise motion of the key lock lever without moving the key lock cable.

Further, since only a slight downward force of the first urging means is applied to the position pin, it is possible to improve the operability of the shift lever.

Further, since the position pin located at the Park position is pinched between the key lock lever and the support lever by the strong elastic force of the second urging means, the play between the position pin and the key lock lever, the support lever can be eliminated, so that it is possible to operate the interlock mechanism securely.

What is claimed is:

1. A shift lever apparatus, comprising:
   a shift lever (30) having a position pin (31) shifted between a park position (P) and drive positions;
   a shift lever lock mechanism (40) for locking the position pin located at the park position having:
   a key lock lever (41) formed with a first arm portion (41a) and a second arm portion (41b);
   a support lever (42) pivotally supported by the second arm portion (41b) of the key lock lever and formed with an end arm portion (42a), the position pin (31) being pinched between the first arm portion (41a) of the key lock lever (41) and the end arm portion (42a) of the support lever (42);
   first urging means (44) for urging the first arm portion (41a) of the key lock lever (41) toward the position pin;
   second urging means (45) for urging the end arm portion (42a) of the support lever (42) toward the position pin; and
   a lock lever (43) associated with the key lock lever (41) to lock the position pin located at the park position;
   an actuator (46) for selectively pivoting the lock lever (43) between lock and unlock positions of the position pin located at the park position; and
   a key interlock mechanism (60) driven by an engine key and linked with the second arm portion (41a) of the key lock lever (41) via a key lock cable (61).

2. The shift lever apparatus of claim 1, wherein when the shift lever is shifted to the park position and the engine key is removed from said key interlock mechanism, the key lock cable (61) is locked by said key lock mechanism (60) and thereby the key lock lever (41) is also locked, so that the position pin (31) is pressure pinched between the first arm portion (41a) of the key lock lever (41) and the end arm portion (42a) of the support lever (42) and further the key lock lever (41) pivots the lock lever (43) to the lock position of the position pin.

3. The shift lever apparatus of claim 2, wherein under these conditions, a load applied to the position pin (31) is transmitted to only the support lever (42), and a slight elastic force of the first urging means (44) is applied to the key lock lever (41) without moving the key lock cable (61) for prevention of erroneous operation of the key interlock mechanism (60).

4. The shift lever apparatus of claim 2, wherein under these conditions, a slight elastic force of the first urging means (44) is applied to the position pin (31) to reduce a force for moving a knob button (34) of the shift lever (30).

5. The shift lever apparatus of claim 2, wherein under these conditions, the position pin (31) is pinched between the first arm portion (41a) of the key lock lever (41) and the end arm portion (42a) of the support lever (42) by a strong elastic force of the second urging means (44) to eliminate a play between the position pin (31) and the first arm portion (41a), the end arm portion (42a) for improvement of reliability of said key interlock mechanism.

6. The shift lever apparatus of claim 1, wherein when the engine key is rotated to an ON position, the actuator (46) is energized to pivot the lock lever (43) to the lock position of the position pin (31) and further the key lock cable (61) is unlocked by said key lock mechanism (60); and when a brake pedal is further depressed, the actuator (46) is deenergized to move the lock lever (43) to the unlock position of the position pin, so that the position pin (31) can be shifted from the park position to the drive position by pivoting the key lock lever (41) and the support lever (42).

7. The shift lever apparatus of claim 6, wherein under these conditions when the shift lever (30) is shifted to the drive position, the key lock lever (41) and the support lever (42) are both pivoted in contact with the position pin by an elastic force of the first urging means (44) without delay of a downward motion of the position pin.

8. The shift lever apparatus of claim 6, wherein under these conditions when the shift lever is returned to the park position, the actuator (46) is energized to pivot the shift lever (43) to the lock position of the position pin, and the key lock lever (41) is pivoted by the shifted position pin (31) to pull the key lock cable (61) so that key interlock mechanism (60) is set unlocked to allow the engine key to pivot to a LOCK position at which the engine key can be removed.

* * * * *